United States Patent

Brault et al.

Patent Number: 5,601,959
Date of Patent: Feb. 11, 1997

[54] DIRECT TRANSFER ELECTROGRAPHIC IMAGING ELEMENT AND PROCESS

[75] Inventors: Donald A. Brault, Southbridge; Douglas A. Cahill, Belchertown; Dene H. Taylor, Holyoke, all of Mass.; Anthony K. Webb, Vancouver, Wash.

[73] Assignee: Rexam Graphics, Inc., South Hadley, Mass.

[21] Appl. No.: 372,858

[22] Filed: Jan. 13, 1995

Related U.S. Application Data

[63] Continuation-in-part of Ser. No. 115,562, Sep. 3, 1993, abandoned.

[51] Int. Cl.⁶ ............................................. G03G 13/01
[52] U.S. Cl. ...................... 430/126; 430/47; 430/124; 428/195; 428/202
[58] Field of Search ...................... 430/47, 124, 126; 428/195, 202

[56] References Cited

U.S. PATENT DOCUMENTS

| | | |
|---|---|---|
| 3,716,360 | 2/1973 | Osamufukushima et al. |
| 3,920,880 | 11/1975 | Akiyama et al. ................ 428/500 |
| 4,020,215 | 4/1977 | Michaylor ........................ 428/420 |
| 4,201,701 | 5/1980 | Coyey . |
| 4,234,644 | 11/1980 | Blake et al. ..................... 428/204 |
| 4,459,352 | 7/1984 | Jones et al. ................. 430/533 X |
| 4,542,052 | 9/1985 | Shadbolt et al. ................. 428/40 |
| 4,569,584 | 2/1986 | St. John et al. ................ 346/157 |
| 4,686,163 | 8/1987 | Ng et al. ........................... 430/47 |
| 4,977,136 | 12/1990 | Fujiwara et al. ............... 503/227 |
| 4,983,487 | 1/1991 | Gilreath ........................... 430/126 |
| 5,071,728 | 12/1991 | Watts ........................... 430/47 X |
| 5,102,768 | 4/1992 | Light et al. .................... 430/126 |
| 5,108,867 | 4/1992 | Zwaldo et al. ................. 430/126 |
| 5,217,773 | 6/1993 | Yoshida et al. ................. 428/40 |
| 5,400,126 | 3/1995 | Cahill et al. .................... 430/126 |

FOREIGN PATENT DOCUMENTS

| | | | |
|---|---|---|---|
| 437073 | 7/1991 | European Pat. Off. . | |
| 944941 | 12/1963 | United Kingdom | 430/126 |

*Primary Examiner*—Mark Chapman
*Attorney, Agent, or Firm*—Breneman, Georges & Krikelis

[57] ABSTRACT

A process and associated element for forming an image on an substrate using an electrographic element comprising a releasable dielectric image receptive layer supported on an electrically conductive carrier sheet by applying an adhesive coating on the substrate front surface, producing a toned image on the image receptive dielectric layer, contacting the image to the adhesive layer thereby adhering the electrographic element to the substrate, and separating and removing the carrier sheet from the image receptive layer, whereby the image receptive layer and the toned image remain on the substrate.

15 Claims, 3 Drawing Sheets

DIRECT TRANSFER ELECTROGRAPHIC IMAGING ELEMENT AND PROCESS

This is a continuation in part of application Ser. No. 08/115,562 filed Sep. 03, 1993 now abandoned.

BACKGROUND OF THE INVENTION

1. Field of the Invention

This invention relates to electrographic processes for making images. More particularly, this invention relates to electrographic processes and the elements used therein for the production of images on substrates that are not readily amenable to direct electrographic imaging.

2. Description of Related Art

The use of electrographic processes to generate images, including multicolor images, is well known in the art. In such processes, a latent image in the form of a distribution of electric charges is produced directly on a substrate having a dielectric surface using an electrographic printer. The printer operates by depositing charge imagewise onto the dielectric surface of the substrate using a scanning stylus or a plurality of styli are arranged in linear arrays across the width of the moving dielectric surface to create charge patterns.

Color images may be generated using a plurality of serially positioned charge depositing and toning stations which operate sequentially to apply three or four colors on a moving web to generate a colored image thereon. U.S. Pat. No. 4,569,584 discloses apparatus for color image reproduction which uses only one stylus array with toning stations located on either side of this array; the accepting surface web is traversed to-and-from to make successive images using different color toners.

Electrographic images are inherently of low gloss. There are two reasons for this. Firstly, the technology the toners which form the image retain most of their shape and unity on drying, rather than flowing and showing a smooth surface. This prevents the image from gaining more than a slight degree of gloss. Additionally, the surface of the image receptive layer must itself be a matte surface for the generation of the image.

The toned surface is exposed and thus vulnerable to damage in handling and viewing. Protective coatings for images are often used to give resistance to abrasion, UV light degradation, bacterial degradation, molds and fungi, unwanted markings especially graffiti or to chemical degradation from water, smog or other chemical agent.

Together, these factors lower the aesthetic and practical value of the prints and induce a very high proportion of the practitioners of the art to apply an additional coating by lamination or spray to the electrographic image, which is an extra processing step, and which adds cost.

Another difficulty for the electrographic printing industry is that there are many substrates upon which it is desirable to print. Many of these could conceivably be manufactured in forms suitable for direct electrographic imaging but their development or manufacture is uneconomical and hence they are either expensive or outright unavailable. Examples of this include colored papers and films, and electrographic imageable fabrics. Then there are those which because of their physical properties (bulk, stiffness, low strength, elasticity, or structure) can not be transported through a printer and hence are completely unsuited for electrographic imaging. Thick films, papers and boards; wooden, ceramic and metal surfaces are but a few examples. The practitioners of the art will quickly identify more. The ability to provide images on such substrates is desirable.

The generation of images on substrates by first generating the image on a highly transparent electrographic element and then adhering the complete element to a substrate using a suitable adhesive agent is practiced in the art. The deficiencies of this method are that to obtain high transparency the electrographic element must comprise a film carrier and image quality on electrographic elements in which the carrier is film have generally lower image quality than those where the carrier is paper. Films are also more costly than papers.

A method for transferring a fixed image, such as an electrographically produced toner image, from an initial substrate to a final substrate is disclosed in U.S. Pat. No. 4,983,487. The disclosed method employs an adhesive-coated film to lift the toned image from its initial substrate and to secure it to the final substrate. The film remains in place after the transfer is completed and serves to encapsulate and protect the image. The initial substrate remains intact and may be reused.

A transfer process is disclosed in U.S. Pat. No. 5,102,768 for providing a non-electrostatically transferred toned image. In this process, an electrostatic latent image is conventionally formed on the surface of an element and that element is conventionally developed into a visible image by applying toner powder. The toned image is then thermally transferred from the surface of an element by contact to the face of a thermoplastic film that is strippably laminated to a paper or like backing. The film is then positioned against a receiver with the toner image therebetween, and the composite is subjected to two successive stages of compressive heating. It is disclosed that the process produces high resolution images from very small particle size toner powder on rough paper.

An offset transfer process of electrographically produced toner images is disclosed in U.S. Pat. No. 5,108,865. In the disclosed process, a liquid toned image is generated on the surface of an electrographic element. The image is adhered to the adhesive surface of a temporary receptor sheet which comprises a carrier layer, releasable release layer, and a transferable adhesive layer secured to the release layer. The temporary receptor sheet with the image adhered thereto is removed from the electrographic element, and then the image surface of the temporary receptor sheet is contacted with a final receptor surface. The adhesive layer secures the toner image, adhesive layer and release layer to the final receiving layer and the carrier layer is removed from the release layer to generate the final image wherein the release layer now is a top protective layer.

The electrographic processes disclosed in the patent publications discussed supra, employ a transfer of the toned image from an electrographic element to the final substrate using an intermediate transfer element. Although advances have been made in retaining the integrity of the toned image, such transfer steps remain prone to image degradation by abrasion or chemical interaction unless added laminating or coating steps are used.

There continues to be a need for a simplified process to provide protected, distortion-free, full-color images, particularly, for use on large format posters, billboards and the like.

SUMMARY OF THE INVENTION

It is an object of the present invention to provide a process for forming an image on an substrate having a front surface, using an electrographic element comprising a releasable dielectric image receptive layer supported on an electrically conductive carrier sheet, the process comprising:

(a) Applying an adhesive coating on said substrate front surface;

(b) Producing a toned image on said image receptive dielectric layer (c) Contacting the image receptive layer and the toned image thereon to the adhesive layer thereby adhering the electrographic element to the substrate; and (d) Separating and removing the carrier sheet from the image receptive layer, whereby the image receptive layer and the toned image remain on the substrate to form an image thereon.

Preferably the image is a colored image.

The contacting of the toned image receptive layer to the adhesive layer may be performed under pressure or under heat and pressure.

In a variation of the above, the electrographic element may further include an intermediate layer located between the image receptive layer and the carrier sheet.

The intermediate layer may be a protective layer or a decorative layer. In this case, the carrier sheet is separated from the intermediate layer rather than the imaging layer. The adhesive bond between the imaging layer and the carrier sheet, or the intermediate layer and the carrier sheet as the case may be, is less than the adhesive bond between the toned imaging layer and the adhesive layer after the two have been contacted.

It is a further object of the present invention to provide an imaging element suitable for generating images on a substrate coated with an adhesive surface layer, wherein the electrographic element comprises a conductive carrier and a releasable dielectric image receptive layer wherein the image receptive layer has been coated by extrusion coating. A preferred resin for use in the extrusion coated dielectric layer is Ethylene Vinyl alcohol.

The aforementioned objects, features and advantages of this invention will become apparent from the following detailed description in conjunction with the accompanying drawings.

DETAILED DESCRIPTION OF THE INVENTION

The invention will next be described with reference to the accompanying drawings. The present invention relates to a novel two step process for forming an electrographic image on a receptor substrate using a multilayer electrographic element.

The electrographic element comprises, a conductive carrier sheet 24, and a dielectric layer 26; The dielectric layer 26 is a transparent, releasable dielectric layer. By releasable is meant a layer adhering to a supporting layer sufficiently to permit handling the electrographic element through the process of generating a toned image thereon without failure of the adhesion, but not so well as to prevent removal of the layer from the supporting layer without failure of the layer integrity when the dielectric layer is contacted to an adhesive layer and the adhesive layer peeled off. That is, the dielectric layer has a bonding force with the carrier sheet which is weaker than the bonding force between the image receptive layer and the adhesive layer. The dielectric layer has an image receptive surface, which is the surface furthest away from the carrier sheet, and an inner surface which is the surface closest to the carrier sheet.

Figure 1:
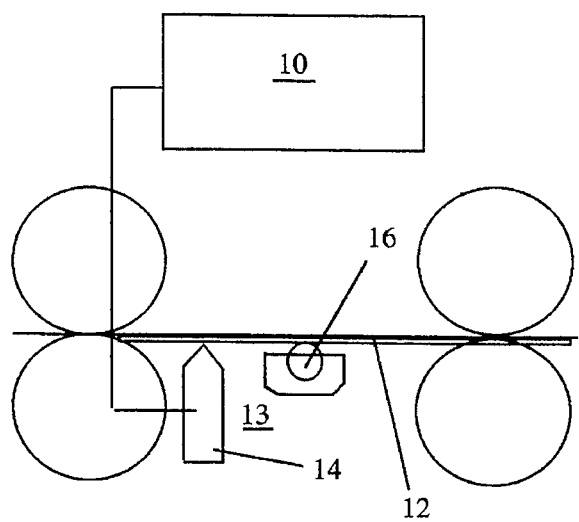
FIG. 1 shows in schematic representation an apparatus for practicing generating an electrographic image for use in the process of the present invention.

The novel electrographic imaging process comprises the following steps:

An Electrographic toned image is created on the image receptive surface of the dielectric layer of an electrographic element of the type described briefly above. This is typically done using an electrographic printer of the type shown schematically in FIG. 1. Such printers are well known in the art and typically may comprise an image source which may be a computer 10, and a mechanical arrangement for generating an image on an electrographic element. The computer 10 in addition to providing image information to the printing station of the printer, usually also controls all functions of the printer, including driving an electrographic element 12 through an imaging station 13 which may comprise an array of styli 14. The computer addresses the styli and instructs them to deposit a predetermined amount of charge on the image receptive surface of the electrographic element. A latent image in the form of a charge distribution is thus formed on the image receptive surface of the electrographic element 12.

Figure 2:
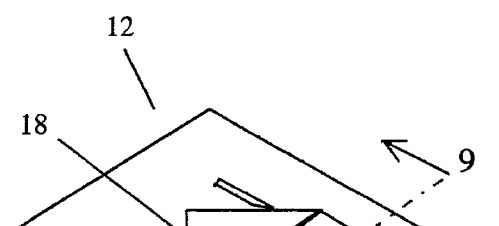
FIG. 2 shows a schematic perspective representation of an electrographic element imaged in the apparatus of FIG. 1 in accordance with the present invention.

The element is next transported through a toning station 16 where an appropriate toner is applied onto the image receptive surface to produce a toned image 18 as shown in FIG. 2. The toning station may include a fixing substation where the applied toner is fixed, by heat or pressure or both, onto the image receptive surface.

When a colored image is desired to be reproduced the above process is repeated with additional toners of different colors, in either sequentially arranged imaging and toning stations or by passing the element under the same imaging station and replacing the toner in the toning station. Color reproduction usually requires three and preferably four different color toners to render a pleasing and accurate facsimile of an original color image. The selection of toner colors and the creation of the different images whose combination will provide such accurate rendition of an original image is well known in the art and not the subject of the present invention.

Figure 9:
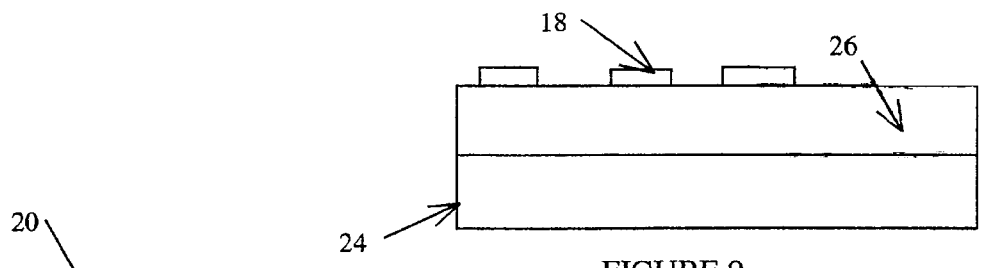
FIG. 9 is an elevation crossection taken along the view marked "9—9" on FIG. 2.

The image 18 created on the image receptive surface in accordance with the present process illustrated in FIGS. 2 and 9 (which shows an elevation crossection taken along 9—9 of FIG. 2), is a mirror image of the desired reproduction.

Figure 3:
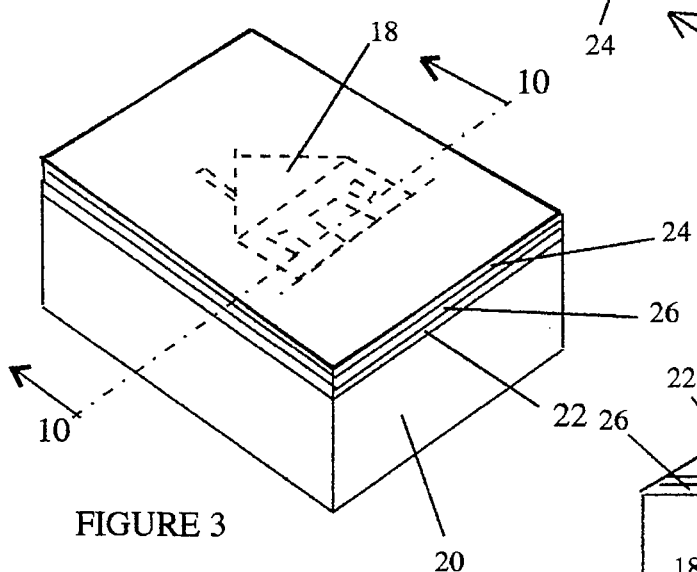
FIG. 3 shows a schematic perspective representation of the electrographic element of FIG. 2 adhered onto a permanent receptor.
Figure 10:
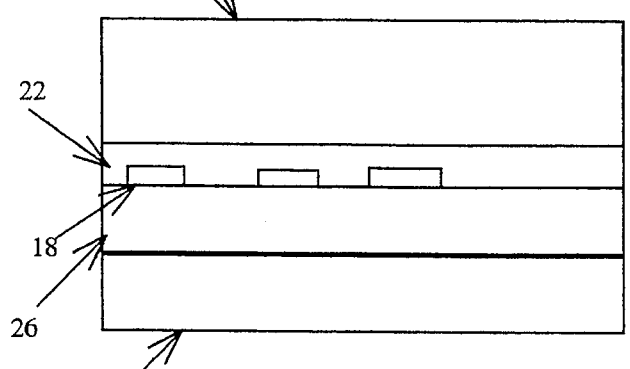
FIG. 10 is an elevation crossection taken along the view marked "10—10" on FIG. 3.

The image 18 is next transferred onto a permanent receptor 20, which may be any substrate on which one desires to have the image placed. FIG. 3 illustrates this step. FIG. 10 is an elevation crossection taken along '10—10' of FIG. 3, showing the element adhered onto the permanent receptor 20. The permanent receptor 20, typically functions as the final support for the imaged electrographic element formed during the process steps of this invention.

The permanent receptor may be any substrate having a surface upon which an electrographic image is to be placed for display. Typically, it is a web or sheet material possessing dimensional stability and adherence properties to the toned image layer of the imaged electrographic element. The web or sheet material may be a flexible polymeric film, e.g., such as polyethylene terephthalate film and the like; a foraminous material, e.g., such as a paper sheet, textile fabrics, and the like; metal films or webs, e.g., such as aluminum, steel, tin-plate, and the like; or any composites or laminates thereof. The permanent receptor may be a rigid or semi-rigid sheeting or plate, e.g., such as sheeting or plates of metal, glass, ceramic, plastic, cardboard, brick wall, papers, paperboards, wood, leathers and composites of the above or laminates thereof. The permanent receptor may vary in size from that of a photographic print, e.g., having an area of about 30 cm$^2$ or less, to that of billboards, e.g., having an area of about 70 m$^2$ or greater. The permanent receptor may also be surface treated or coated with a material to enhance desired surface characteristics.

Prior to the transfer step, the surface of the permanent receptor that will receive the image, is coated with an adhesive to form an adhesive layer 22. The adhesive may be spayed thereon, e.g. 3M Scotch™ Brand Spray Mount™ Artists Adhesive, particularly where the surface or overall nature of the receptor is such that other coating methods are impractical; or the adhesive may be coated with a roller, or again applied by lamination or other coating techniques. Depending on the intended use of the final product it is also contemplated that the back surface of the permanent receptor may be coated with an adhesive.

The adhesive layer 22, may exhibit tackiness at room temperatures, or may be non tacky at room temperatures and be heat or pressure activated. The applied heat is selected to raise the temperature of the adhesive layer to a point sufficient to activate the adhesive properties of the layer. As used in this specification, $T_{Aa}$ is the temperature at which the adhesive layer begins to display adhesive properties towards a substrate, and is also referred to as the activation temperature of the adhesive layer. The dielectric layer which is discussed in more detail herein below, also exhibits adhesive properties if heated to a high enough temperature. $T_{Ad}$ is the temperature at which the dielectric begins to display adhesive properties (becomes tacky) towards a substrate. It should be noted that $T_{Ad}$ is different from $T_g$, the glass transition temperature of the dielectric, typically $T_{Ad}$ being greater than $T_g$.

One more temperature needs to be defined at this point. This is the temperature of lamination, that is the temperature at which the layers are heated during the contacting step of the transfer process, wherein an imaged dielectric layer is transferred and adhered onto an adhesive coated substrate. This lamination temperature is identified as $T_{Lam}$; in the process in accordance with this invention, the following relationship is observed during transfer: $T_{Aa} \leq T_{Lam} \leq T_{Ad}$.

Heat activated adhesive layers may be chosen from a variety of conventional thermal adhesive materials. Typically, the thermally activated adhesive material is comprised of thermoplastic polyurethanes; polycaprolactone; acrylic copolymers; and combinations thereof. Representative thermally activated adhesive materials include Morthane® CA-116 urethane resin (a product of Morton International); Tone® Polymer P767E biodegradable plastic resin (a product of Union Carbide); Elvax® 240 vinyl resin (a product of Dupont Chemicals); and the like.

The adhesive layer 22, may be created just prior to image transfer, or may be created ahead of time at a different location from where the transfer is to occur. If tacky at room temperatures, the adhesive layer 22, may be protected with a removable cover sheet which is be removed prior to use and discarded.

An additional adhesive layer may be applied on the imaged dielectric surface prior to contacting said surface onto the adhesive coated substrate.

The electrographic element 12, bearing the toned image and the permanent receptor 20 with the adhesive layer 22, are next brought into intimate contact. The imaged surface is contacted to the adhesive covered surface of the permanent receptor. Care must be exercised in this step to assure that contact is complete between the two surfaces and that there exist no air pockets. A squeegee roller is useful in expelling any air trapped between the two surfaces.

Where the adhesive layer is non tacky at room temperature, and the adhesive layer requires heat and/or pressure for activation of its adhesive properties, such heat and or pressure may be applied either contemporaneously with the contacting step, or as a separate subsequent step.

Preferably, where the nature of the permanent receptor is such as to allow it, lamination of the electrographic element onto the permanent receptor will yield the best results. Lamination may be in a roller laminator, or using vacuum. Lamination is particularly effective where the permanent receptor is a sheet like element which may be readily driven through a laminator. In cases where a heat activated adhesive may be used, i.e. where the activation temperature is such that will not harm the permanent substrate, heat may be applied during the lamination process to activate the adhesive as the imaged surface is contacted thereon.

Adhesives that are non tacky at room temperatures are preferred since they permit a certain amount of movement of the electrographic element after it has been contacted to the adhesive layer which allows for air to escape from between the layers, and in some instances if desired for aligning the image after it has been placed on the receptor.

When the adhesive is tacky while the image is contacted thereto, the adhering step occurs contemporaneously with the contacting step. In this case, it is preferred that the image be rolled onto the tacky layer, and pressure be applied with a roller squeegee, allowing air to escape as the two surfaces are contacted.

Figure 11:
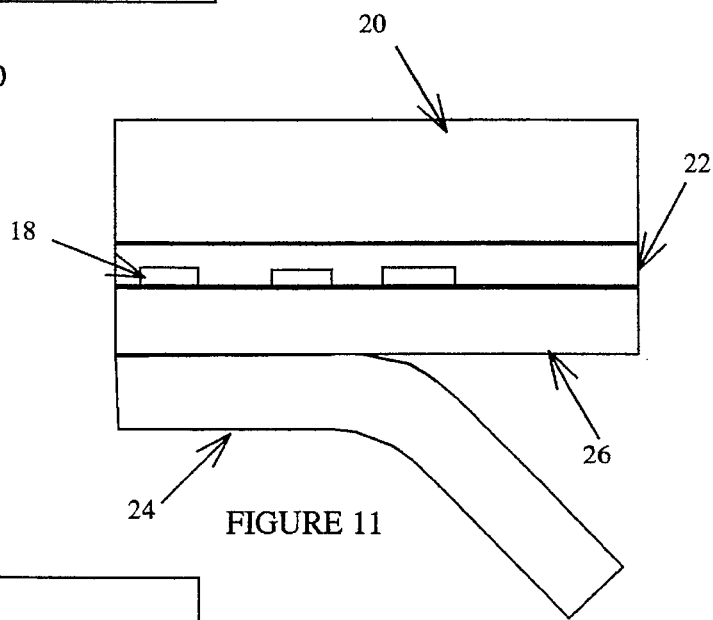
FIG. 11 is a schematic representation illustrating the removal of the carrier sheet after the element has been adhered to the permanent receptor.

After the contacting and adhering step has been completed, the carrier sheet 24 is separated from the dielectric layer by peeling this carrier sheet off. FIG. 11 illustrates this step.

Figure 4:
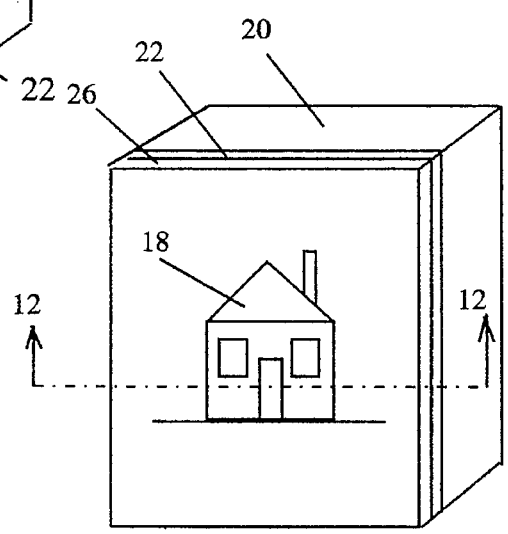
FIG. 4 shows a schematic perspective representation of the final product produced in accordance with this invention, that is an properly oriented image on a permanent support after the carrier sheet has been removed.
Figure 12:
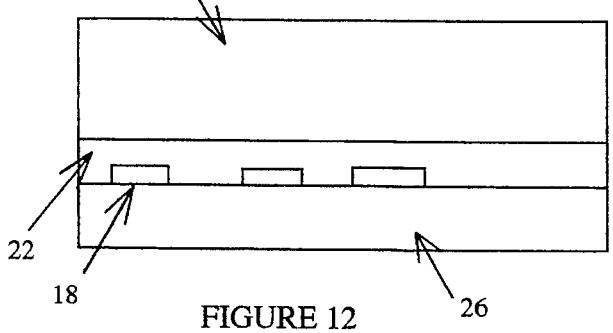
FIG. 12 is an elevation crossection taken along the view marked "12—12" on FIG. 4.

Shown in FIG. 4 is the final product of this process, which is a properly oriented image 18 on a permanent substrate 20, viewed through a transparent dielectric layer 26. This layer 26 now serves as a protective layer over the toned image. FIG. 12 shows the relative position of the various layers in the final product.

As stated earlier, the electrographic element useful for the practice of this invention must include an image receptive, transparent, releasable dielectric layer 26, coated over a conductive carrier sheet 24. A number of such elements are illustrated in FIGS. 5, 6, 7 and 8.

The conductive carrier sheet may be electrically conductive or semi-conductive, e.g., such as metal foils, metalized polyethylene terephthalate films, conductive paper sheeting and the like having an electrical resistivity of about 1 to 30 meg-ohm per $cm^2$. It may be in sheet or web form.

The conductive carrier sheet 24, may be a weakly conductive or a non conductive support treated or coated on one or both sides with a material to provide a conductive surface or render it conductive, and to enhance desired surface characteristics. In this case, the conductive carrier sheet usually comprises a flexible polymeric film, e.g., such as polyethylene terephthalate film and the like, or a foraminous material, e.g., such as a paper sheet and the like which is coated with a conductive layer. The conductive layer comprises a film-forming, organic material, e.g., such as a cation type styrene-methacrylate copolymer, having an electrical resistivity of about 1 to 30 meg-ohm per $cm^2$. Suitable film-forming, organic materials include polymeric quaternary ammonium compounds, anionic polymers, intrinsically conductive polymers, polystyrene sulfonic acid, polymeric matrices capable of ionizing inorganic electrolytes contained therein, and the like; graphite, conductive clays, conductive pigments such as copper iodide, antimony doped tin oxide or indium doped tin oxide may all be used alone or in conjunction with binders and other materials.

The dielectric layer 26, may be any conventional film-forming material having a dielectric constant of about 2 to about 5. This layer typically has a thickness in the range of about 1 μm to about 20 μm and preferably in the range of about 5 μm to about 15 μm. It is preferred for this layer to have a high degree of transparency. Transparency is aided by avoiding the use of opaque pigments, and by minimizing the content of other pigments, light scattering or light absorbing materials.

Because the writing head in the electrographic imaging equipment contacts the dielectric layer during the imaging process, suitable dielectric layers for use in this process must also exhibit the following physical properties. The imaging dielectric surface must be rough and slightly abrasive, and the dielectric layer must be flexible enough to permit the imaging element to conform to the electrographic head. In the electrographic imaging process the writing head typically comprises small pins in contact with the element dielectric surface. The degree of roughness of this surface is important because it determines the average gap between the pin tips and the element surface. Such gap must remain between 6 and 12 μm to maintain good image quality.

Abrasiveness is introduced in the dielectric surface to clean the writing head by scraping off adhering dielectric particles. Finally while the dielectric layer must be sufficiently pliable to wrap around the writing head without cracking, it must not be too soft or tacky at the temperature at which the writing occurs.

In practical terms this translates to selection of materials for the dielectric layer which have a glass transition temperature ($T_g$) preferably above about 30° C. and typically less than about 100° C. and a surface roughness preferably between about 6 and 10 μm from peak to valley. Various dielectric layers satisfying these requirements for the dielectric layer (26) are well known in the art as disclosed, for example, in U.S. Pat. Nos. 3,920,880 and 4,201,701. Furthermore, because of the operating requirements of this process explained earlier in conjunction with the selection of the adhesive layer, the dielectric layer adhesive activation temperature $T_{Ad}$ must be selected higher than the adhesive layer activation temperature $T_{Aa}$.

The layer 26, typically comprises one or more polymers selected from polyvinylacetate, polyvinylchloride, polyvinylbutyral, polymethylmethacrylate, styrenated acrylics, styrene acrylonitrile, and the like. Other ingredients may be chosen from waxes, polyethylene, alkyd resins, nitrocellulose, ethylcellulose, cellulose acetate, shellac, epoxy resins, styrene-butadiene copolymers, clorinated rubbers, polyacrylates, and the like. The property requirements of the dielectric layer (16) are well known in the art as disclosed, for example, in U.S. Pat. Nos. 3,920,880 and 4,201,701.

In a preferred embodiment, an example of which is given below, the dielectric, image receptive layer 26, is formulated from hot melt extrudable resins.

The necessary release characteristics, may be obtained in one of several different manners. For instance appropriate release characteristics may be obtained by controlling the degree of bonding between the dielectric layer and the surface of the conductive carrier sheet by incorporation of release agents in the conductive layer or by selection of the components of the conductive and dielectric materials, such that the adhesion is inherently weak; proper release may also be obtained by the application of a separate release layer; by use of a conductive layer of very low cohesive strength; or by use of weakly bonding carrier sheets bonding weakly to the image receptive dielectric layer.

The term weak, as herein used, means that the bonding force between a first layer that will transfer with the image and a second layer (or surface) supporting it, is less than the bonding force between the first layer and a final layer (or surface) onto which the transfer occurs, or, as the case may be, weaker than both the bonding force between a third also transferring layer and the final layer onto which the transfer occurs and the bonding force holding the first layer attached to such third layer; also, the bonding force between the first and second layers is such that the separation of the first layer from the second, supporting layer, occurs without damage to it.

Depending on the selection of the resins in the dielectric layer, proper release characteristics may be obtained by hot melt extrusion coating the dielectric layer onto the carrier sheet and such process is preferred. An example of such extrusion coated dielectric layer having the proper adhesion properties is given in Example 1 herein bellow.

Figure 5:
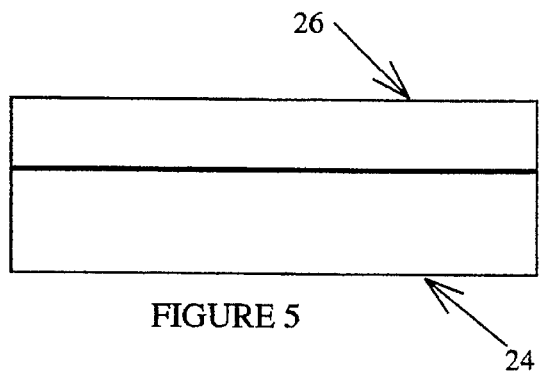
FIG. 5 is an elevation crossection of an element useful in practicing this invention.
Figure 6:
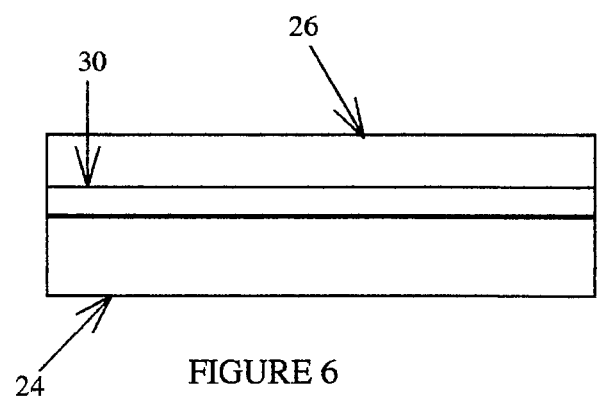
FIG. 6 is an elevation crossection of another element useful in practicing this invention.
Figure 7:
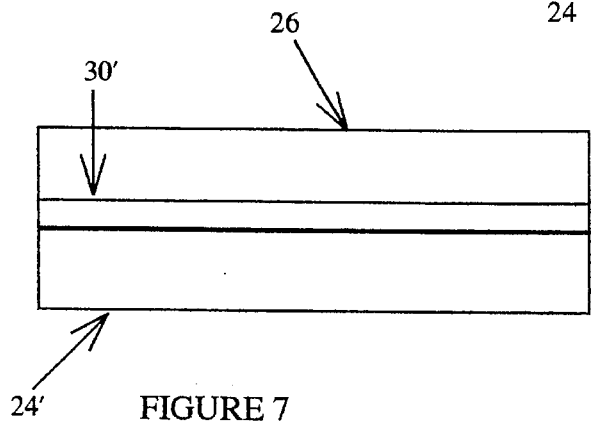
FIG. 7 is an elevation crossection of yet another element useful in practicing this invention.
Figure 8:
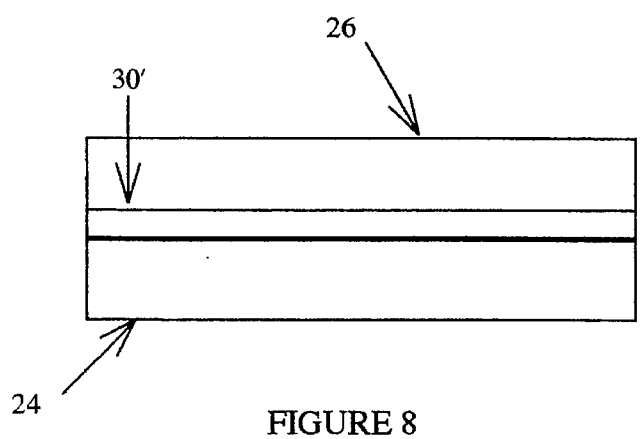
FIG. 8 is an elevation crossection of yet another element useful in practicing this invention.

The dielectric layer 26 may be coated over the conductive carrier 24 directly, as shown in FIG. 5, or there may be an intermediate, release layer 30 or 30' as shown in FIGS. 6, 7, and 8, coated between the dielectric layer and the conductive carrier.

If a separate release layer is used, it may be made conductive in which case it will function in the imaging process as part of the conductive carrier. When a conductive release layer 30' as shown in FIGS. 7 and 8 is used, the carrier layer may be a non conductive support 24' or a conductive or conductivized support 24.

If the release layer is not conductive then it will function as part of the dielectric layer. Depending on the nature of this release layer, it may remain on the carrier sheet after image transfer, or, if transparent, transfer with the transferred image becoming an outermost cover sheet. This may be desirable if additional cover to the transferred image is desired, particularly if one wishes to impart a certain surface texture. If the release layer is to transfer with the dielectric layer 26, it must bond firmly to the dielectric image receptive layer to ensure transfer to the substrate at the time of image transfer. If the layer is a dielectric, its thickness must complement the thickness of the image receptive layer so that the combined dielectric layer has the proper electrical characteristics for the imaging process to function properly.

As a result of the present image transfer process to a permanent receptor wherein the dielectric layer also transfers with the image and wherein the dielectric layer after transfer becomes the outermost layer overlaying the toned image and completely sealing the image, protection of the image to abrasion, fading, chemical degradation or damage will be imparted to some degree by the image receptive layer. This protection is enhanced by adding appropriate materials to the formulation of the dielectric layer. Thus, UV blockers may be added to improve fade resistance, crosslinkers may be added to enhance strength, and the resins used may be selected to optimize these characteristics. Inhibition to the growth of molds, fungi and bacteria may also be obtained by the elimination of micropores in the dielectric layer, and by including suitable anti-microbial chemicals, including biocides and/or fungicides, in this layer.

The dielectric image receptive layer may be also used to impart controlled gloss characteristics to the final image. This may be done by providing a textured surface on the side of the dielectric layer that is in contact with the carrier layer, by using a carrier sheet having a selected textured surface. This surface texture is duplicated on the dielectric surface in contact with the carrier sheet and after separation thereof becomes the front surface of the image. Depending on the texture, the image may appear mat or glossy, or have a preselected level of gloss.

The use of a separate release layer which transfers with the image provides added opportunity for better image protection, particularly since this layer is not imaged and thus allows more flexibility in the materials included therein. Thus, solvent resistance can be obtained by using solvent resistant materials, fading can be minimized by a layer containing UV blocking agents, and strength can be imparted by a layer of tough resin using materials that would, if included in the image receptive layer, tend to degrade the performance of the image receptive layer. This protective layer may also be formed from fluoro-polymers which additionally display a high resistance to the marking materials liked by graffiti artists. The anti-microbial characteristics may also be included in this layer. Combinations of these materials may be used to impact these properties to various degrees.

This additional layer may also be used to impart decorative characteristics to the final image if it is composed of or contains the appropriate materials. Thus it might be colored or tinted, or contain metallic type pigments to give it a sheen or lustre.

The electrographic process of this invention will now be illustrated by the following examples but is not intended to be limited thereby.

EXAMPLE 1

An electrographic element was constructed by extrusion coating a polymeric resin onto a conductive carrier sheet. The conductive carrier sheet was conductivized opaque 90 gms paper base (supplied as OCB90 by Chartham Paper Mill, Canterbury, Kent, U.K.).

A layer of Ethylene Vinyl Alcohol (EVOH)—Kuraray EPE 105A was extruded onto the base using an extrusion coater to coating weight of 9 g/m$^2$ at a coating line speed of 30 m/min. to form an image receptive dielectric layer having weak adhesion to the carrier sheet.

The coated carrier sheet was then slit to form 11 inch wide stock web; A monochrome toned electrographic image was produced on the dielectric image receptive layer with a Versatec V80 plotter. This image was a mirror image of the desired image.

An adhesive layer coating solution was prepared from the following ingredients:

| Ingredient | Parts by weight |
| --- | --- |
| Methyl Ethyl Ketone | 77.96 |
| Toluene | 10.00 |
| Morthane ® CA-116 urethane resin | 12.00 |
| Amorphous silica (ave. particle size 3 um) | 0.04 |

This mixture was coated onto the vinyl side of Scotch-Cal™ 220 adhesive backed vinyl. The mixture was dried in a forced air oven for 30 s at 240° F. The material was cooled before any use. After cooling the surface was substantially tack free.

The contacting and adhering step was performed by first laying the imaged electrographic element from example 1 on to the vinyl so that the imaged layer contacted the layer of urethane. This composite was then passed through the hot nip of a hot roll laminator at a speed of 2 fpm at a pressure of 14 pli (90 psi cylinder pressure) and at 225° F. After the composite had cooled to room temperature the carrier sheet was stripped from the image receptive layer. The image on the vinyl support was viewed through the dielectric layer and was properly oriented. The image integrity and the visual quality were retained. The image had an attractive lustrous appearance.

A second imaged electrographic element was next prepared as above and contacted to a sheet of ScotchCal™ 220 adhesive backed vinyl so that the dielectric layer was in direct contact with the vinyl layer. This composite was passed through the hot nip of the same laminator used above at a speed of 2 feet per minute (fmp), a pressure of 15 pli (100 psi cylinder pressure) and a temperature of 225° F. The composite was allowed to cool to room temperature at which time the carrier sheet was stripped from the image receptive vinyl layer. The dielectric layer remained attached to the carrier sheet, and did not adhere to the vinyl layer.

EXAMPLE 2

Using the electrographic element disclosed in example 1 imaged as disclosed in that example, the image was transferred onto a steel surface which had been sprayed with 3M Scotch™ Brand Spray Mount™ Artists Adhesive. The adhesive was permitted to dry for 1 minute. The contacting and adhesion step was performed by first laying the imaged electrographic element so that the imaged layer contacted the layer of adhesive sprayed onto the steel surface, and then pressing firmly across the structure. The paper support was stripped from the image receptive layer leaving the image on the steel. The dielectric layer acted as a protective layer overlaying the toner image.

EXAMPLE 3

The process of example 2 was repeated but the image was transferred onto a wood surface that had been coated by spraying with 3M Scotch™ Brand Spray Mount™ Artists Adhesive.

EXAMPLE 4

An electrographic element prepared in accordance with example 1 was imaged in a Versatec Spectrum color printer using Cyan, Magenta, Yellow and Black liquid toners. The image was then contacted and adhered onto a cardboard sheet having an adhesive coated thereon. The cardboard with the adhesive coated thereon is supplied by Pres-On Merchandizing Corporation of Madison Ill. under the trade name "50 pt. claycote, Lo-tack", and exhibits adhesive properties at room temperature. Following the adhering step, the carrier sheet was removed and the dielectric image receptive layer with the image remained on the cardboard, with the dielectric layer overlaying the image.

EXAMPLE 5

A conductive carrier was prepared by coating 0.002 inches thick untreated Polyethylene Terephthalate film (PET) with a conductive coating prepared by adding in a portable mix tank, 38.00 parts of Ethyl Alcohol and 38.00 parts of Deionized Water and mixing therewith with a Lightning mixer for 10 minutes, 24 parts of Chemistat 6300H containing 8% Solids. Chemistat® 6300H electroconductive polymer is a product of Sanyo Chemical Industries and is a cation type styrenemethacrylate copolymer in aqueous solution. The coating was applied using reverse roll coating and hot air drying at 240° F. (~115° C.) for two minutes to give a dry coating weight of 0.5 pounds per thousand square feet.

The conductivized carrier sheet was next reverse roll coated with a dielectric layer to achieve a dry dielectric layer coating weight of 1.0 pounds per thousand square feet. Hot air drying was again used. The dielectric layer was prepared as follows:

5.86 parts by weight of Dowanol® PM, 49.19 parts by weight of Toluene and 19.10 parts by weight of Methyl Ethyl Ketone were added to a Kady Zolver Tank. Dowanol® PM is propylene glycol mono methyl ether and is a product of Dow Chemical. To the mixture were added 2.10 parts by weight of Syloid 74, (Amorphous Silica with average particle size of 9 microns, produced by Davison Chemical, a W. R. Grace Company.) and 1.00 part by weight of Translink® calcined clay under very slow speed agitation, and then allowed to mix for 30 minutes under high speed agitation. Translink® 37 calcined clay, is a product of Englehard Corporation. After this, 22.75 parts by weight of Lustran 33-1000 (A Styrene Acrylonitrile co-polymer made by Monsanto Co. of St. Louis, Mo.) were added very slowly under slow speed agitation and mixed at high speed for 60 minutes.

Samples of this coated material were slit to 36 inches width, and conditioned at 50% Relative Humidity. A colored image was generated on the dielectric surface of a 36 inch wide sample of this material, using a Calcomp 68436 electrostatic printer using standard toners and printing conditions, however the image produced was a mirror image of the desired final image.

Using the same lamination process as in example 1 the toned image was transferred onto a heavy cardboard sheet coated with a heat activated adhesive supplied by the Pres-On Merchandizing Corp. of Addison Ill. under the trade name "Pres-on® 80 pt. Heat activated Claycote". After the image surface was contacted and adhered to the heat activated claycote, the carrier sheet was removed. The full color image was successfully transferred, the final result being the toned colored image covered by the dielectric layer which acts as a protective layer.

EXAMPLE 6

Using the electrographic element of example 4 imaged as described in example 4, the dielectric image receptive layer and the toned color image were successfully transferred to a steel and to a wood surface both which had previously been coated with 3M Scotch™ Brand Spray Mount™ Artists Adhesive, using the process of examples 2 and 3 above respectively. In both instances the carrier layer was removed after contacting and adhering the imaged layer with the tacky permanent receptor leaving on the permanent receptor a right reading image of the original, covered by a transparent dielectric layer.

EXAMPLE 7

An electrographic element was prepared as follows:

A 63 g/m opaque conductive paper available as Product DR Base from Otis Specialty Papers, Livermore Falls, Me., was coated by the offset gravure method with a silicone release layer identified as SWM 96"C" available from Release International, West Chicago, Ill. at a coated weight of 1.95 g/m². The release layer was cured after coating, by electron beam radiation. The surface electrical resistivity of the release coated surface measured at 50% RH was 3 Mohs/square, the surface energy was between 25 and 30 dynes/cm, and the Sheffield Smoothness was 20 ml/min.

A dielectric coating mixture which also has protective properties, was prepared from the following ingredients:

| Ingredient | Parts by Weight |
| --- | --- |
| Ethanol | 120 |
| Acetone | 440 |
| Toluene | 720 |
| Butvar B-76[1] polyvinyl butyral | 130 |
| E-342[2] Acrylic Resin | 440 |
| Syloid ® 74[3] Amorphous silica | 20 |
| Hydrocarb ® PG3[4] | 175 |
| Piccolastic ® A-5[5] | 52 |

[1]Butvar ® B-76 polyvinyl butyral (weight ave. molecular weight: 90,000–120,000) is a product of Monsanto Company, St. Louis, Missouri.
[2]E-342 Acrylic resin is a product of Rohm and Hass and is a solvent based modified acrylic copolymer.
[3]Syloid ® amorphous silica is produced by Davison Chemical Division, W. R. Grace & Co., Baltimore Md. in various average particle sizes
[4]Hydrocarb ® PG3 wet ground calcium carbonate with average particle size of 3 gm is a product of OMYA, Proctor, Vermont.
[5]Piccolastic ® A-5 low molecular weight polystyrene is a product of Hercules Co., Wilmington, Delaware.

The first three of the above ingredients were added to a Kady mill and the Butvar® was stirred in. After 15 minutes of mixing the acrylic resin and the polystyrene were added after a further 5 minutes of mixing the calcium carbonate and the amorphous silica were added and the mixing continued for 10 minutes.

The above dielectric mixture was applied to the release coated surface of the conductive base paper by reverse roll coating and dried to give a dry coat weight of 7.3 g/m² to form the electrographic element.

Rolls of the electrographic element were moisturized to a level of about 6% by weight and a four color image layer was deposited on the dielectric layer using the Versatec® 8944 Color Electrostatic Printer of example 1 and standard toners and plotting conditions. Image quality was rated high.

A cold mounting pressure sensitive adhesive film (Clearmount™ from Sallmetall of Dallas, Tex.) was applied to white pressure sensitive vinyl (Rexcal™ 4000 from Rexham Branded Products, Lancaster, S.C.) and the backing sheet removed to expose the adhesive. The imaged element was applied to the adhesive with modest pressure from a wiping tool without heat. Thus the dielectric layer did not exhibit any adhesive properties as it would have at elevated temperatures equal to or above its $T_{ad}$. The base was then removed, the break occurring between the release layer and the combined dielectric and adhesive layer. The toned image and the dielectric coating remained adhered to the vinyl sheet and the release coating remained on the paper. Image quality was good. Transfer was complete.

EXAMPLE 8

The adhesive film of Example 7 was applied to a 4 inch diameter galvanized steel can and the backing sheet removed. An imaged element prepared as described in Example 6 was applied to the adhesive layer with modest pressure from a wiping tool. The temporary carrier sheet was removed to expose the image. Image quality was good and transfer was complete.

EXAMPLE 9

The steps of Example 7 were followed except that the paper used in the base was opaque conductive paper, 70 g/m², Product OCB-12 from Chartham Paper Mills, Canterbury, Kent, U.K. Image quality was good.

The resulting samples from examples 6, 7 and 8 were tested for adhesive strength of the image layer structure onto the permanent receptor by the tape pull test using 810 Scotch™ Brand Tape. All passed.

The same samples were tested for abrasive strength by scrubbing with household liquid soap, hot water with a fibre scrubbing brush for one minute. No damage to the image was seen.

Although this invention has been described in considerable detail with particular details to certain preferred embodiments thereof, it is understood that various modifications and variations can be effected by the art practitioners within the spirit and scope of the invention.

What is claimed is:

1. An electrographic element comprising a transparent, releasable dielectric image receptive layer having a dielectric adhesive activation temperature $T_{Ad}$ supported on an electrically conductive carrier sheet for use in producing an image on a permanent receptor substrate having a front surface, by a process comprising:

(a) Applying an adhesive coating to form an adhesive layer on said substrate front surface, the adhesive coating being tacky at a temperature less than the adhesive activation temperature $T_{Ad}$ of the dielectric layer;

(b) Producing a toned mirror image of the image on the image receptive layer of the electrographic element (c) Contacting the image receptive layer and the toned image thereon, to the adhesive layer and adhering the electrographic element to the substrate; and (d) Separating and removing the carrier sheet from the dielectric image receptive layer, whereby the dielectric image receptive layer and the toned image remain on the substrate;

said releasable dielectric image receptive layer having a bonding force with the carrier sheet which is weaker than the bonding force between the image receptive layer and the adhesive layer at a temperature below said dielectric adhesive activation temperature $T_{Ad}$.

2. An electrographic element according to claim 1 wherein the dielectric layer supported on the carrier sheet has a glass transition temperature $T_g$ of less than about 100° C. and an imaging surface roughness between about 6 and 12 μm.

3. An electrographic element according to claim 2 wherein the dielectric layer supported on the carrier sheet has a back surface in contact with a surface of the carrier sheet, and wherein the carrier sheet surface has a preselected texture, and such texture is imparted on the back surface of said dielectric layer in contact with said carrier sheet.

4. The electrographic element according to claim 1 wherein the dielectric layer is coated on the supporting carrier sheet by extrusion coating.

5. The electrographic element according to claim 1 wherein the dielectric layer comprises Ethylene Vinyl alcohol.

6. An electrographic element according to claim 1 further comprising a transparent release layer between said carrier sheet and said dielectric image receptive layer.

7. An electrographic element according to claim 6 wherein the release layer is transparent and has a bonding force with the carrier sheet which is weaker than both the bonding force between the image receptive layer and the release layer and the bonding force between the adhesive layer and the image receptive layer whereby in step (d) following the separating and removing step, the release layer, the dielectric image receptive layer and the toned image remain on the substrate.

8. An electrographic element according to claim 6 wherein the release layer is conductive.

9. The element according to claim 6, wherein the release layer has a bonding force with the carrier sheet which is stronger than the bonding force between the dielectric layer and the adhesive layer after activation of the adhesive layer whereby in step (d) the release layer is removed from the dielectric layer and remains on the carrier sheet.

10. The element according to claim 9, wherein the release layer is non transparent.

11. The element according to claim 6 wherein the release layer has been coated onto the carrier sheet by hot melt extrusion.

12. The electrographic element according to claim 1 wherein the dielectric layer comprises a Polyvinyl Butyral, an Acrylic resin, and a Polystyrene.

13. An image formed on a permanent receptor substrate having a front surface, by a process comprising:

(a) electrographically producing a toned mirror image of the image on an electrographic element comprising a transparent, releasable dielectric image receptive layer which becomes tacky at an adhesive activation temperature $T_{Ad}$, supported on an electrically conductive carrier sheet, the toned image being on said transparent, image receptive releasable dielectric layer;

(b) applying an adhesive coating on said substrate front surface the adhesive coating being tacky at a temperature $T_{Aa}$ less than adhesive activation temperature $T_{Ad}$;

(c) Contacting the image receptive layer and the toned image thereon, to the adhesive layer and adhering the electrographic element to the substrate; and (d) Separating and removing the carrier sheet from the dielectric image receptive layer, whereby the dielectric image receptive layer and the toned image remain on the substrate.

14. The image formed by the process of claim 13 wherein the electrographic element further comprises a release layer coated between said dielectric layer and said conductive layer whereby in step (d) the release layer together with the dielectric image receptive layer and the toned image remain on the substrate.

15. The image formed by the process of claim 13 wherein the electrographic element comprises a transparent, releasable dielectric image receptive layer having a glass transition temperature $T_g$ and a conductive carrier sheet, the dielectric layer having a front image receptive surface and a back surface, the carrier sheet having a front surface, the dielectric layer being supported by the carrier layer, the back surface of the dielectric layer in contact with the front surface of the carrier layer, and wherein the carrier sheet front surface has a preselected texture, and such texture is imparted on the back surface of said dielectric layer, and wherein the toned image is created on the front surface of said transparent, image receptive releasable dielectric layer.

* * * * *